United States Patent [19]
Clapp

[11] 4,213,689
[45] Jul. 22, 1980

[54] ELECTROMAGNETICALLY ACTUATED SHUTTER MECHANISM FOR CAMERAS

[76] Inventor: Roy A. Clapp, 10522 Foley Blvd., Minneapolis, Minn. 55433

[21] Appl. No.: 22,693

[22] Filed: Mar. 22, 1979

[51] Int. Cl.² .............................................. G03B 9/10
[52] U.S. Cl. .................................... 354/234; 354/255
[58] Field of Search ............... 354/234, 235, 227, 254, 354/255, 233, 258

[56] References Cited
U.S. PATENT DOCUMENTS

| | | | |
|---|---|---|---|
| 3,687,042 | 8/1972 | Mizui et al. | 354/234 |
| 3,718,079 | 2/1973 | Fuller | 354/233 |
| 3,724,350 | 4/1973 | Mielke | 354/234 |
| 3,883,885 | 5/1975 | Orlando | 354/258 |
| 4,060,313 | 11/1977 | Kondo | 354/234 X |
| 4,088,405 | 5/1978 | Pustka et al. | 354/234 X |

*Primary Examiner*—John Gonzales
*Attorney, Agent, or Firm*—Peterson, Palmatier, Sturm & Sjoquist, Ltd.

[57] ABSTRACT

The shutter mechanism includes a blade pivotally mounted intermediate its ends. Nearer one end of the blade is an opening through which the subject is viewed when focusing the camera and through which the picture itself is later taken as the blade swings from one side of the optical axis to the other. Nearer the other end of the blade is a permanent magnet which is cooperable with three electromagnets. Appropriate energization of the electromagnets effects the various blade movements.

9 Claims, 8 Drawing Figures

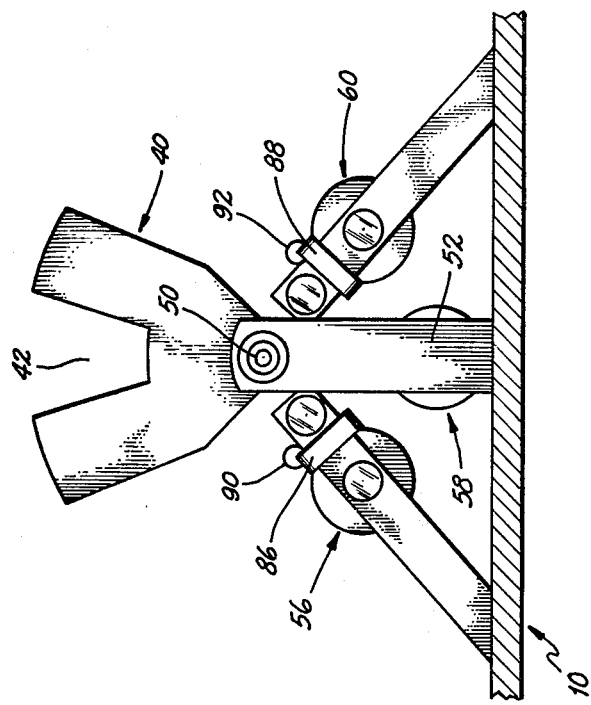
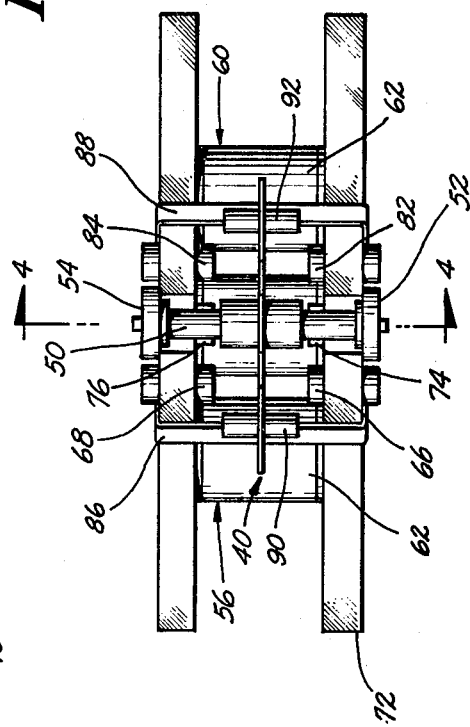
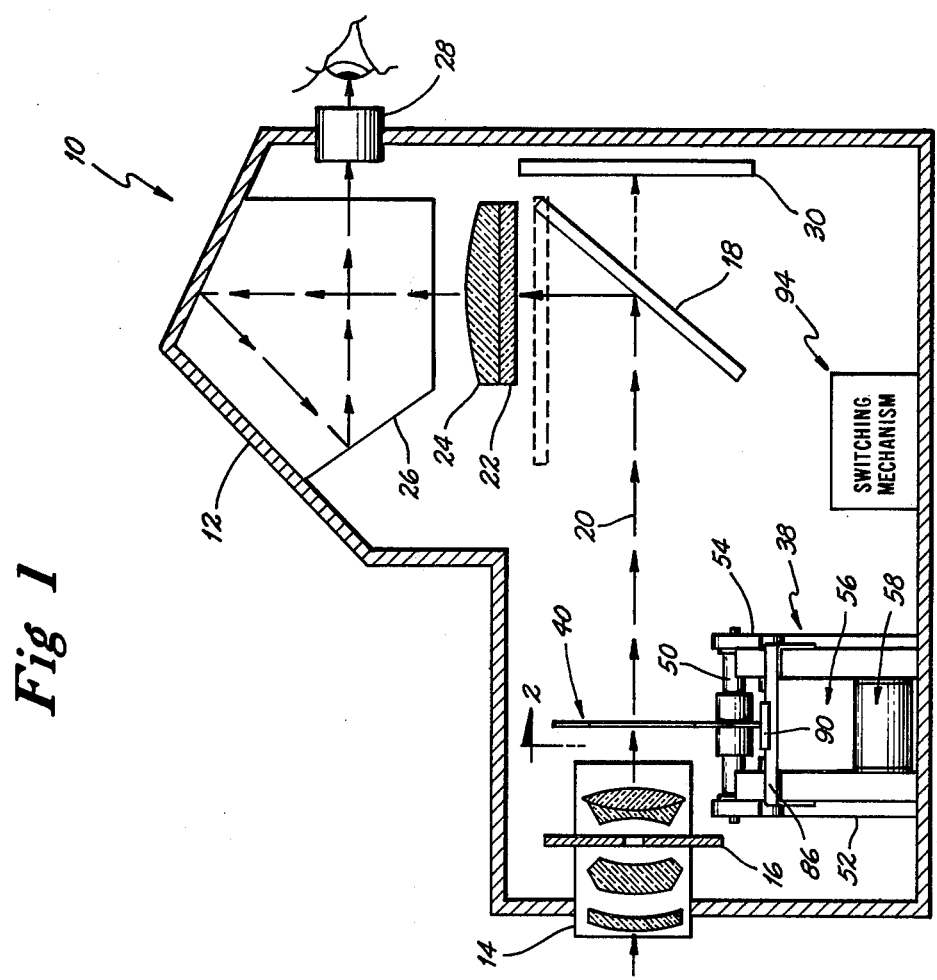

ELECTROMAGNETICALLY ACTUATED SHUTTER MECHANISM FOR CAMERAS

BACKGROUND OF THE INVENTION

1. Field of the Invention

This invention relates generally to camera shutters, and pertains more particularly to a shutter mechanism for cameras of the reflex type.

2. Description of the Prior Art

A variety of cameras have been devised for taking a large number or quantity of portraits, such as in school photography, shopping center portrait operations, and large volume studio portraiture. Cameras of this character are frequently electrically powered, providing for automatic film advance following each exposure. This type of camera usually employs a film magazine capable of handling rolls of 100 feet or more of film, ranging in width from 35 mm to 70 mm. Recently, a single lens reflex camera has been made available for large volume photographic work, and the present invention is of great advantage when incorporated in a camera of this design, although it can be used with other cameras, such as a twin lens reflex camera.

However, cameras of the foregoing type, which operate for a large number of cycles, are subject to far greater wear than the usual amateur camera, this being particularly true with respect to their shutter mechanisms. Since shutter leaves are by nature inherently delicate, they do not withstand heavy use. Shutter failure has, therefore, become a serious problem because the camera operator may not be aware of the failure until the film is processed, making it necessary to return to the location for retakes. The need for a reliable and durable shutter mechanism is therefore of considerable importance.

SUMMARY OF THE INVENTION

Accordingly, one object of the present invention is to provide a shutter mechanism that is not subject to significant wear, even though repeatedly used for high volume photographic operations.

Another object of the invention is to provide a shutter mechanism that is quiet in its operation and virtually devoid of vibration.

Still another object is to provide a shutter mechanism in which the shutter blade can be operated with a very short exposure time.

Yet another object of the invention is to provide a shutter mechanism in which the shutter blade is balanced gravitationally so that the camera can be operated in both vertical and horizontal positions, thereby permitting the taking of horizontal group pictures as well as vertical single portraits.

A further object is to provide a shutter mechanism that lends itself readily to incorporation in various electrically controlled cameras, the present invention enabling the previously employed electric controls to still be utilized.

The invention has for still another object the provision of a shutter mechanism that will be exceedingly simple as far as its construction and operation are concerned.

The invention has for a further object the provision of a shutter mechanism that will be relatively inexpensive to manufacture, thereby encouraging its use in various types of cameras, particularly those that are used virtually constantly in the taking of various types of portraits.

Another object of my invention is to provide a means for stopping the shutter movement at each end of its pivotal movement which stopping means is likewise of a durable nature.

Briefly, my invention comprises a pivotal shutter blade having an opening near or at one end thereof and having a permanent magnet carried near or at the other end thereof, the blade being pivotally mounted intermediate its ends at a location in which it is gravitationally balanced. The permanent magnet on the pivotal blade is cooperable with three fixedly located electromagnets which are energized in a manner such as to initially orient or position the shutter opening in the optical path, that is, in alignment with the camera lens and diaphragm, so that the subject can be viewed directly with the assistance of a sloping mirror. Before the sloping mirror is retracted, the electromagnets are energized so as to swing the pivotal shutter blade into an angular position with the opening to one side of the optical axis so that a portion of the blade prevents light from impinging upon the film. When a picture is to be taken, however, the mirror is retracted and the electromagnets energized in a manner so as to cause the shutter blade to pivot to a second angular position which places the opening to the other side of the optical axis, the image being recorded on the film as the opening passes through the optical path.

BRIEF DESCRIPTION OF THE DRAWINGS

FIG. 1 is a side elevational view, somewhat diagrammatically depicted, of a single lens reflex camera with my shutter mechanism incorporated therein;

FIG. 2 is a front elevational view of my shutter mechanism, the view being taken in the direction of line 2—2 of FIG. 1;

FIG. 3 is a top plan view of FIG. 2;

DESCRIPTION OF THE PREFERRED EMBODIMENT

Figures 4, 8:
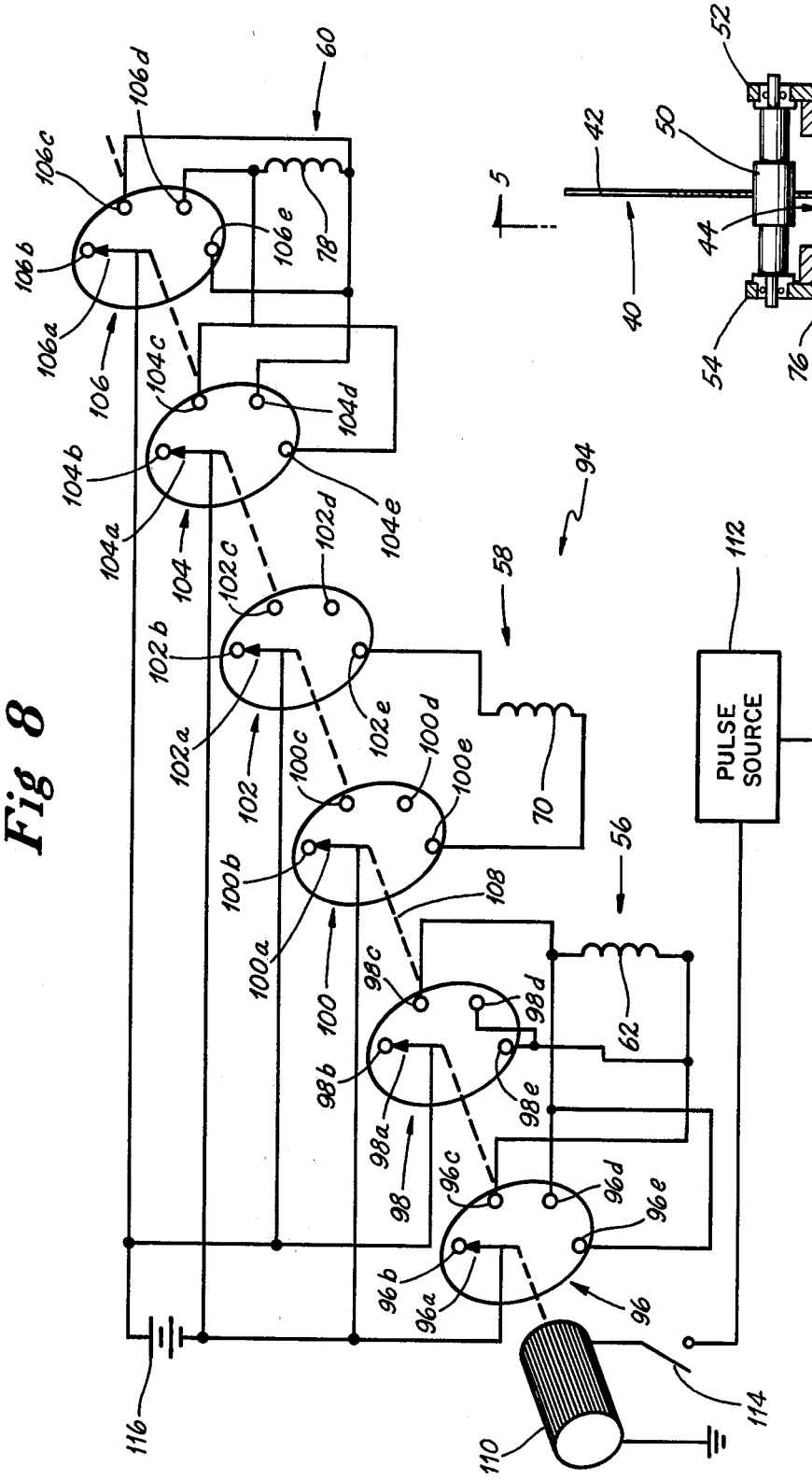
FIG. 4 is a transverse sectional view taken in the direction of line 4—4 of FIG. 3.
FIG. 8 is a schematic electrical diagram illustrating how the pivotal shutter blade is electromagnetically moved into its several positions.
Figure 5:
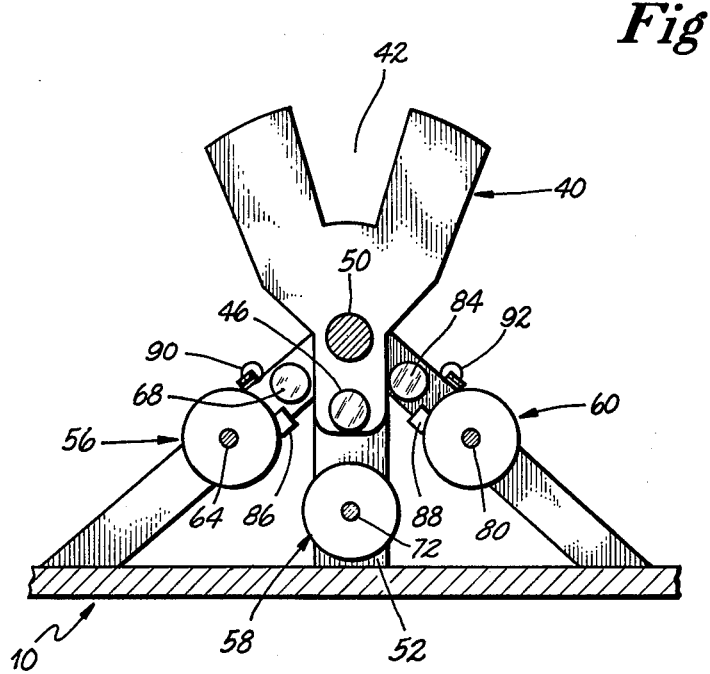
FIG. 5 is a sectional view taken in the direction of line 5—5 of FIG. 4 with the shutter blade vertical and its opening in alignment with the lens and diaphragm for viewing of the subject.

Although my invention will also find utility as far as in a twin lens reflex camera, the present description will be presented in conjunction with a single lens reflex camera. Inasmuch as cameras of this type are generally well known and understood, FIG. 1 is only a diagrammatic representation of a single lens reflex camera. It will be helpful, it is believed, to refer to the basic components, even though of conventional construction.

Accordingly, the single lens reflex camera pictured in FIG. 1 has been denoted generally by the reference numeral 10. It comprises the usual housing 12 containing therein a lens assembly 14. Juxtaposed with respect to the lens assembly 14 is a diaphragm 16, which can be of the conventional iris type.

Continuing with the description of the camera 10 shown in FIG. 1, a sloping mirror 18 is shown which in its solid line position reflects light coming through the camera lens 14 and diaphragm 16 upwardly from the optical path or axis 20 to a ground glass 22 and condenser lens 24. The upwardly reflected light after passing through the glass 22 and lens 24 then enters a pentaprism 26 and is reflected within the prism 26 from its vertical upward path into a horizontal path. The light exits from the pentaprism 26 via an eyepiece 28 through which the photographer or operator views the subject, seeing the image displayed on the ground glass 22 during the time that the light traversing the optical path 20 is intercepted by the mirror 18.

Although the film holder is not illustrated, it will be recognized that when the mirror 18 is swung upwardly into its dotted line position the light coming into the camera through the lens assembly 14 and the diaphragm 16 will strike the film labeled 30. Inasmuch as various means have been employed for retracting the mirror 18 from its light reflecting or solid line position into its light passing or dotted line position, no need exists for showing any such means.

Describing now my shutter mechanism which has been denoted generally by the reference numeral 38, it will be discerned that this mechanism 38 includes a thin aluminum blade 40 having a notch or opening 42 adjacent its upper end and a cylindrical permanent magnet 44 adjacent its lower end. The magnet 44 includes first and second poles 46, 48, the pole 46 projecting from one side of the blade 40 and the other pole 48 projecting from the opposite side thereof.

In order to permit the blade 40 to be readily operated in both vertical and horizontal positions of the camera 10, the blade is gravitationally balanced. More specifically, the upper end portion, as can be discerned from FIG. 2, is considerably wider than the bottom portion in order to permit the forming of the opening or notch 42 therein, the narrower lower portion compensating for the weight of the permanent magnet 44 carried thereon.

A shaft 50 extends through the blade 40, projecting from each side of the blade at a location which is at the center of gravity of the blade 40 and the magnet 44. The ends of the shaft 50 are journaled in a pair of upright bearing standards 52, 54 mounted on a base plate 56. The journaling of the shaft 50 in the standards 52, 54 provides a pivotal axis for the blade 40 which axis is located at the center of gravity of the blade 40 and the magnet 44.

At this time, attention is directed to three electromagnets 56, 58 and 60, these magnets being angularly spaced, as can be seen from FIG. 2. More specifically, the magnet 56 includes a winding 62 and iron core 64, the core 64 being in the form of a yoke providing spaced poles 66 and 68 which coact with the poles 46 and 48 of the permanent magnet 44. Similarly, the magnet 58 includes a winding 70 and iron core or yoke 72 providing spaced poles 74 and 76, these poles 74, 76 also being cooperable with the poles 46, 48 of the magnet 44. Likewise, the electromagnet 60 has a winding 78 and iron core or yoke 80 in order to provide additional poles 82, 84 which also coact with the permanent magnet 44.

Recapitulating somewhat, the yokes or cores 64, 72 and 80 are what might be termed C-shaped, their respective energizing windings encircling portions thereof between the poles. When any of the electromagnets 56, 58 and 60 are electrically energized, then a magnetic field exists between the poles 66 and 68, 74 and 76, 82 and 84, as the case may be, and when these poles have a polarity opposite the poles 46 and 48 of the permanent magnet 44, then the permanent magnet 44 will be attracted so that the poles 46 and 48 thereof will move into alignment with the poles of the electromagnet so energized. On the other hand, when any of the electromagnets 56, 58 and 60 are reversely energized so that its polarity is the same as the permanent magnet, then the permanent magnet is repelled. In this way the position of the blade 40 can be controlled by selectively energizing the electromagnets 56, 58 and 60 so that the permanent magnet 44 is either attracted or repelled.

Before describing typical circuitry for energizing the electromagnets 56, 58 and 60, reference will be made to a pair of copper bridging strips 86, 88, each having a slitted tubular stop 90, 92 thereon of suitable plastic. Because the strips 86, 88 are of copper, there is no magnetic path established through either strip. The purpose of the stops 90 and 92, it can be pointed out, is to prevent any overshoot of the shutter blade 40 at each end of its travel when moving from one angled position to the other. Consequently, the shutter blade 40 will be closed and remain so in either of its angled positions in which the notch or opening 42 is at one side of the other of the optical axis 20, thereby preventing any light from passing onto the film 30.

By energizing the central electromagnet 58 with current flowing in a direction to attract the permanent magnet 44, and simultaneously energizing the outer electromagnets 56 and 60 with current flowing in an opposite direction to repel the permanent magnet, the shutter blade 40 will be centralized so that the opening or notch 42 is in registry with the optical path 20. This, quite obviously, permits light to be transmitted to the mirror 18 and reflected upwardly to the viewing screen 22. The energizing power for changing the angular position of the blade 40 need be only momentary since the permanent magnet 44 is normally attracted by the soft iron poles of whatever electromagnet it has become aligned with. This provides a detent action during the focusing. However, continued energization of the electromagnet 58 will strengthen the detent action.

As explained above, there are three electromagnets 56, 58 and 60. When any of these magnets are energized with a given polarity with respect to the polarity of the permanent magnet 44, they may either retract or repel the permanent magnet 44 carried adjacent the lower end of the shutter blade 40.

If the electromagnet 56 is energized with a current flow in a direction to cause it to attract the permanent magnet 44, and simultaneously the electromagnet 60 is energized in a direction so as to repel the permanent magnet 44, the shutter blade 40 will flip or swing to one side so that the opening 42 is to one side of the optical path 20, thereby preventing light from striking the film 30 when the mirror is retracted or raised into its dotted position of FIG. 1.

On the other hand, when the direction of current in the two electromagnets 56 and 60 is reversed from that in the paragraph immediately above, the permanent magnet 44 is urged in an opposite direction, thereby causing the shutter blade 40 to literally fly over into its opposite angular position with the opening 42 then residing on the other side of the optical axis 20.

It will be appreciated that while the notch or opening 42 is passing across the optical path 20, light is transmitted to the film 30, producing the exposure necessary for recording the image on the film 30 during this brief interval, yet automatically closing or blocking off further light when the shutter opening 42 has passed the optical axis and an opaque portion of the blade 40 then blocks passage of light. Since the exposure time is the transit time of the opening 42 through the optical path 20, the exposure interval can be of very short duration, yet ample for the firing of the strobe light.

It is important to appreciate that the driving force provided by the electromagnets 56, 58 and 60 is imparted to the blade 40 via the permanent magnet 44 without any physical contact, although there is some contact at each end of the shutter swing when the blade 40 strikes either of the two stops 90 or 92. The stops 90, 92 are of plastic and sufficiently resilient so that virtually no jarring or vibration results, particularly inasmuch as the mass of the shutter blade 40 is quite small. Thus, it will be observed that there is no friction as the blade 40 moves from one position to the other and there is also a concomitant lack of wear during this travel.

Referring now in detail to FIG. 8, even though the switching mechanism 94 now to be described would comprise a static solid-state relay, the showing of physical components facilitates an understanding of how my invention functions. Accordingly, the switching mechanism 94 includes a plurality of rotary switch units 96, 98, 100, 102, 104 and 106. The units 96–106 each comprise movable contacts or switch arms 96a, 98a, 100a, 102a, 104a and 106a and respective fixed contacts 96b–96e, 98b–98e, 100b–100e, 102b–102e, 104b–104e and 106b–106e. The movable contacts or switch arms 96a–106a are mounted on a shaft 108 which is rotatably driven by a stepper motor 110 which receives pulses from a pulse source 112 when a switch 114 is closed.

More specifically, the switch contacts 96b, 98b, 100b, 102b, 104b and 106b are not in circuit with any of the electromagnets 56, 58, 60; consequently, when the movable contacts or switch arms 96a, 98a, 100a, 102a, 104a and 106a are in engagement with their respective fixed contacts 96b–106b, none of the electromagnets 56, 58, 60 are energized.

However, when a pulse is received from the source 112, when the switch 114 is closed, the stepper motor 110 advances the various switch arms 96a–106a so as to engage the contacts 96c, 98c, 100c, 102c, 104c and 106c respectively, of the various switch units 96–106. Since the contacts 100c, 102c of the switch units 100, 102 are not connected in circuit with the winding 70 of the central electromagnet 58, this magnet remains deenergized. However, as the switch arms 96a, 98a and 104a, 106a engage the contacts 96c, 98c and 104c, 106c of the switch units 96, 98 and 104, 106, then the winding 62 of the electromagnet 56 is energized from a power supply, such as a battery 116, so that its poles 66, 68 have, say, a polarity of positive and negative, respectively. Inasmuch as the poles 46, 48 of the permanent magnet 44 have an opposite polarity, then the permanent magnet 44 is immediately attracted in the direction of the electromagnet 56, the blade 40, quite obviously, swinging about its pivotal axis, since the magnet 44 is mounted thereon. At the same time, however, the winding 78 of the electromagnet 60 is energized in a reverse direction from the battery 116 so that its poles 82, 84 have a negative and positive polarity, respectively, thereby repelling the permanent magnet 44. The action of the electromagnets 56, 60 is thus such that the shutter blade 40 is swung to the angular position of FIG. 6 so as to be closed or block any light striking the mirror 18 when in its solid line position of FIG. 1 or the film 30 when the mirror 18 is raised into its dotted line position.

With the foregoing having been achieved, then the camera 10 is in readiness for taking a picture. It will be assumed for the time being that the lens 14 has been properly focused prior to closing the switch 114 which shifts the shutter blade 40 from its light transmitting position with its opening aligned with the optical axis 20 to its light blocking position with the opening 42 out of registry with the axis or optical path 20. During the focusing period, which will be discussed more fully hereinafter, the aperture of the diaphragm 16 is wide open. However, it is conventional to have the diaphragm 16 close to the proper opening for the then existing light conditions. This is done at the same time that the mirror 18 is raised or retracted into its dotted line position of FIG. 1. At any rate, with the diaphragm 16 adjusted to its proper opening and the mirror 18 raised, the camera 10 is in readiness for taking a photograph, as already indicated.

The stepper motor 110, when pulsed again from the pulse source 112, causes the various switch arms 96a, 98a, 100a, 102a, 104a and 106a to be advanced to their next contacts, 96d, 98d, 100d, 102d, 104d and 106d, respectively. As far as the winding 62 of the electromagnet 56 is concerned, the direction of current flow through the winding 62 is reversed so that this electromagnet 56 now repels the permanent magnet 44. More specifically, the winding 62 is now connected in circuit with the contacts 96d, 98d rather than the contacts 96c, 98c. The electromagnet 58 remains unenergized at this time in that its winding 70 is not wired to the contact 100d, 102d, as is believed evident in FIG. 8. By reason of the switch arms 104a, 106a engaging the contacts 104d, 106d of the switch units 104 and 106, the current through the winding 78 of the electromagnet 60 is also reversed.

Figure 6:
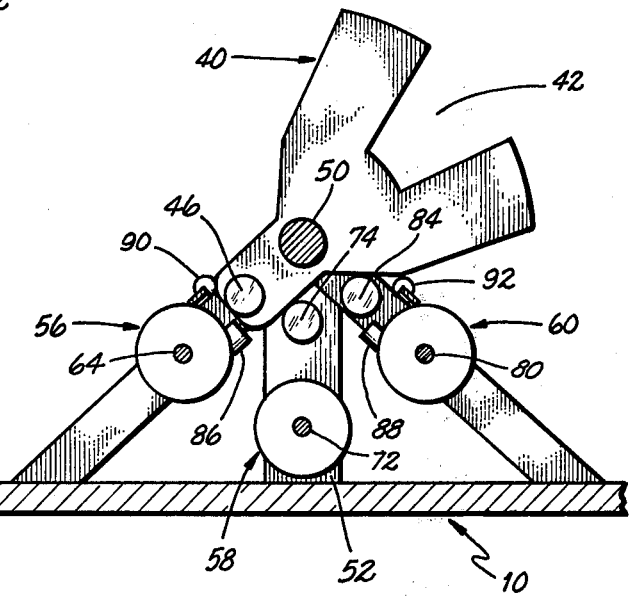
FIG. 6 is a sectional view taken in the same plane as FIG. 5 but with the shutter blade angularly shifted so as to move the opening to one side of the optical axis just prior to the taking of a picture.
Figure 7:
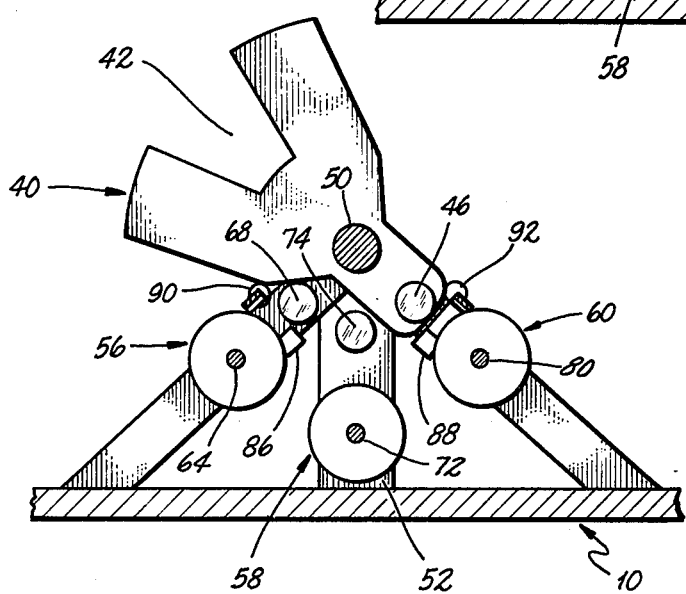
FIG. 7 is another sectional view resembling FIG. 5 but with the shutter blade pivoted to a second angular position with its opening on the other side of the optical axis with respect to the position depicted in FIG. 6 and after the picture has been taken.

The electromagnet 56, as outlined above, thus repels the permanent magnet 44 and the electromagnet 60 now attracts the permanent magnet 44, thereby causing the shutter blade 40 to fly or swing rapidly from the position in which it appears in FIG. 6 to the position in which it appears in FIG. 7. During the movement of the shutter blade 40 from the angled position of FIG. 6 to the angled position of FIG. 7, the notch or opening 42 passes through the optical path 20, thereby permitting light to strike the film 30. Exposure of the film 30 is made during the brief interval that the opening 42 is passing through the optical path 20. Of course, the portion of the shutter blade 40 to one side of the notch or opening 42 then blocks any further passage of light onto the film.

It is during the interval of time, even though quite short, that the shutter 40 is open, that is, when its opening 42 is in alignment with the aperture of the diaphragm 16 and lens assembly 14, that the strobe flash is fired. The firing of the strobe light is conventional and can be triggered by conventional means. After the shutter blade has swung into the position of FIG. 7, the mirror 18 is lowered so as to again assume its solid line position in FIG. 1.

Another pulse from the source 112 will cause the stepper motor 110 to move the various switch arms 96a,

98a, 100a, 102a, 104a and 106a into engagement with the various contacts 96e, 98e, 100e, 102e, 104e and 106e. This will energize the winding 70 of the central electromagnet 58 so that its poles 74, 76 are negative and positive with respect to the poles 46, 48 of the permanent magnet 44 which are positive and negative. In other words, the electromagnet 58 attracts the permanent magnet 44, the winding 70 being connected to the battery 116 through the contacts 100e, 102e and the movable contacts or switch arms 100a, 102a now engaged therewith. At this time, the windings 62, 78 of the other two electromagnets 56, 60 are energized in a manner such as to repel the permanent magnet 44. In other words, the poles 66, 68 and 82, 84 of the electromagnets 56 and 60, respectively, are negative and positive, whereas the poles 46, 48 of the permanent magnet 44 are of opposite polarity. The switch 114 is now reopened to disconnect the motor 110 from the pulse source 112.

Under these conditions the shutter blade 40 has been restored to its central position, thereby readying the camera 10 for the taking of another picture. In other words, an image can be viewed on the screen 22. The diaphragm 16, under these circumstances, would be open to permit the maximum amount of light to reach the mirror 18. It is when the shutter blade 40 is in this position that the subject for the next picture can be viewed through the eyepiece 28 and any needed refocusing of the lens 14 undertaken. Closing of the switch 114 causes the foregoing cycle to be repeated.

It will be appreciated that all of the foregoing actions can take place within a very short interval of time. For instance, the shutter blade 40 may be open only for one one-hundredth of a second or less. In some prior art mechanisms this short exposure period could not be obtained and has been usually one-thirtieth of a second or more. This has been a distinct disadvantage where there has been a sufficient amount of ambient light to capture any movement of the subject, for a double or blurred image results under these prior art conditions.

It will also be recognized that while the swinging or oscillatory movement of the shutter blade 40 is very rapid, the impact of the shutter blade 40 against either of the stops 90 or 92 is very minimal. Not only is the mass of the shutter blade 40 quite small but the stops 90, 92 themselves are preferably of a resilient plastic material, such as vinyl, which effectively dampens any jarring action.

Although my invention has been described with respect to a single lens reflex camera 10, it is also suitable, as already explained, for use with a double lens reflex camera.

I claim:

1. In a camera having an optical axis and film, a shutter blade, means mounting said blade for pivotal movement intermediate the ends of said blade, said blade having an opening nearer one end thereof, permanent magnet means carried by said blade nearer the other end thereof, first, second and third electromagnet means cooperable with said permanent magnet means, and means for energizing said several electromagnet means to pivot said blade in and out of alignment with said optical axis.

2. A camera in accordance with claim 1 in which said first, second and third electromagnet means causes said blade to assume first, second and third angular positions, said first angular position resulting in said blade opening being to one side of said optical axis, said second angular position resulting in said blade opening being to the other side of said optical axis, and said third position resulting in said blade opening being in alignment with said optical axis.

3. A camera in accordance with claim 2 in which said first electromagnet means is aligned with said permanent magnet means when said blade is in its said first angular position, said second electromagnet means is aligned with said permanent magnet means when said blade is in its said second angular position, and said third electromagnet means is aligned with said permanent magnet means when said blade is in its said third angular position.

4. A camera in accordance with claim 3 including means for sequentially energizing said first, second and third electromagnet means to succesively position said blade in its said first, second and third angular positions.

5. A camera in accordance with claim 4 in which said energizing means causes current to flow in said first electromagnet means in a direction to attract said permanent magnet means and to flow in said second electromagnet means to repel said permanent magnet means to position said blade in its said first angular position, to reverse the current flow in said first electromagnet means to repel said permanent magnet means and to reverse the current flow in said second electromagnet means to attract said permanent magnet means to position said blade in its said second angular position, and to cause current to flow in said third electromagnet means in a direction to attract said permanent magnet means while causing current to flow in said first and second electromagnet means to repel said permanent magnet means to position said blade in its said third angular position.

6. In a camera having a lens, diaphragm and film aligned along an optical path, a pivotal shutter blade, a permanent magnet on said shutter blade, and electromagnet means for moving said blade into and out of registry with said optical path, said electromagnet means including first and second electromagnets, means energizing said first electromagnet in one direction to attract said permanent magnet to swing said blade and a portion thereof into registry with said optical path to block the passage of light onto said film, means energizing said second electromagnet in one direction to attract said permanent magnet to swing said blade out of registry with said optical path to permit the passage of light onto said film, means reversely energizing said second electromagnet to repel said permanent magnet when said first electromagnet is energized in said one direction, said electromagnet means including a third electromagnet, said second electromagnet being located between said first and third electromagnets, and means energizing said third electromagnet to attract said permanent magnet to swing another portion of said blade into registry with said optical path to block the passage of light onto said film.

7. In a camera having an optical axis, a shutter blade having an opening near one end, a permanent magnet on said shutter blade near the other end thereof and having poles projecting from opposite sides of said blade, means mounting said blade for pivotal movement about an axis located intermediate the ends thereof so that said blade is movable into a first angular position with said opening to one side of said optical axis, a second position with said opening to the other side of said optical axis and into a third angular position with said opening aligned with said optical axis, a first electromagnet having a pair of spaced poles located so as to receive the poles of said permanent magnet therebetween when said blade is in its said first angular position, a second electromagnet having a pair of spaced poles located so as to receive the poles of said permanent magnet therebetween when said blade is in its said second angular position, a third electromagnet having a pair of spaced poles located so as to receive the poles of said permanent magnet therebetween when said blade is in its said third angular position, and means for energizing certain ones of said first, second and third electromagnets to cause the poles of said permanent magnet to successively move between the pole pairs of said first, second and third electromagnets.

8. A camera in accordance with claim 7 in which said blade is wider at said one end than at said other end, said opening being centrally disposed in said one end and said permanent magnet being centrally disposed in said other end, the center of gravity of said blade and permanent magnet being substantially at said pivotal axis.

9. A camera in accordance with claim 8 including a pair of spaced stops, one edge of said blade striking one of said stops when said blade is swung into its said first angular position and an opposite edge of said blade striking the other of said stops when said blade is swung into its said second angular position.

* * * * *